Patented Mar. 23, 1954

2,673,188

UNITED STATES PATENT OFFICE 2,673,188

METHOD OF MAKING ALUMINA CONTAINING ADSORBENT MATERIALS

Robert E. Schexnailder, Baton Rouge, La., assignor to Standard Oil Development Company, a corporation of Delaware No Drawing. Application December 3, 1951, Serial No. 259,710

7 Claims. (Cl. 252—455)

This invention relates to a process for the preparation of contact or catalytic substances and more particularly relates to a process for the preparation of alumina or alumina-containing contact or catalytic substances or agents and methods of treating hydrocarbons such as hydroforming, catalytic cracking, etc., using said catalysts or contacting agents.

According to the present invention a substantially anhydrous organic solution of an organo alumina compound such as an anhydrous aluminum alcoholate solution is hydrolyzed with a silica hydrogel containing a large proportion of water to form a silica alumina composite which may be further treated as desired. The materials prepared according to the process of the present invention are characterized by high purity and high surface area.

Cracking catalysts exhibiting superior activity and product distribution may be prepared by the present invention by mixing or impregnating silica hydrogel with an anhydrous aluminum alcoholate dissolved in an anhydrous mixture of the alcohol and a relatively low boiling point range hydrocarbon oil. The resulting mixture is preferably mulled or milled when the silica hydrogel contains about 10% or more of solids. When the silica hydrogel contains less than about 10% of solids, milling or mulling or other mixing procedures may be used to accomplish commingling of the alcoholate solution and the silica hydrogel. The water in the silica hydrogel structure precipitates the aluminum as hydrous alumina within the structure of the silica hydrogel and the alcohol and mineral oil are preferably recovered for preparing additional aluminum alcoholate from metallic aluminum.

According to the present invention one method of producing an aluminum alcoholate is to react an essentially anhydrous aliphatic alcohol which is soluble or insoluble in water with metallic aluminum but aluminum alcoholates may be made in any other known manner. The alcohols which may be used in this process include methyl, ethyl, propyl, n-butyl alcohol, secondary butyl alcohol, isobutyl alcohol, pentanol-1, pentanol-2, 2 methyl butanol-4, 2 methyl butanol-3, pentanol-3, hexanol-1, hexanol-2, hexanol-3, the various methyl pentanols, the various dimethyl butanols, the various heptyl alcohols, the various octyl alcohols, etc., including those higher alcohols liquid at the temperature of operation of the process.

Instead of using any one of the alcohols singly, mixed alcohols such as mixed amyl alcohols may be used. Mixtures of alcohols of different molecular weights may be used.

In order to further facilitate the separation of the alcohol from the water when using a water insoluble alcohol a hydrocarbon, such as a petroleum distillate boiling within the range of 200° to 500° F. or higher and preferably in the range of 300° to 400° F. may be added to the alcohol. Instead of using a hydrocarbon fraction, selected hydrocarbons such as heptane, octane, toluene, xylene, etc., may be used. Although such addition of the hydrocarbon is not necessary to the process, the use of the hydrocarbon diluent has the following advantages:

(1) The diluent aids in controlling the reaction of the alcohol and aluminum metal. Heat in the order of 10,000 B. t. u. per pound of aluminum oxide formed upon hydrolysis is liberated during the formation of the alcoholate and the use of the hydrocarbon diluent aids in the dissipation of this heat;

(2) The hydrocarbon serves as a solvent for the solid aluminum alcoholate; and (3) The hydrocarbon diluent greatly aids in the separation and recovery of the alcohol (water insoluble) after the hydrolysis step.

In the presence of a small amount of a catalyst, aluminum metal is reacted with the alcohol and the resulting alcoholate solution is then hydrolyzed with a silica hydrogel to form a silica alumina composite. During the formation of the aluminum alcoholate, substantially pure hydrogen is produced and may be recovered as such.

When using a water insoluble alcohol and hydrocarbon diluent, the alcohol which is regenerated or reformed by the hydrolysis step together with the hydrocarbon diluent or solvent forms a separate and distinct layer from the slurry of water and hydrous silica-alumina composite formed and the alcohol and hydrocarbon are easily recovered and removed simply by decanting or the like. The water slurry of the silica alumina composite is removed for further treatment as will be hereinafter described in greater detail.

The water insoluble alcohol-hydrocarbon mixture contains a small amount of residual water as entrained and dissolved water and is freed from this residual water by a distillation or dewatering step and then may be reused to make additional alcoholate from metallic aluminum. The overhead gases from the drying still are condensed, the condensate allowed to settle and upon settling, separates into a water layer and an alcohol-hydrocarbon layer, the latter being recycled to the drying still. The dried alcohol-hydrocarbon mixture is removed from the bottom of the drying still and is ready for further reaction with additional metallic aluminum.

When using a water soluble alcohol for reacting with aluminum to form the alcoholate which is then hydrolyzed to form a water slurry of the silica alumina composite, the alcohol goes into the water solution and may be recovered by distillation. The recovered alcohol is then dehydrated to anhydrous form before it is again used for reacting with additional metallic aluminum.

The silica hydrogel may be prepared from a substantially pure silica hydrosol made by contacting a sodium silicate solution with a cation exchange material. The silica hydrosol made in this way is substantially pure and the silica hydrogel made from such a silica hydrosol needs no washing to remove impurities. Substantially pure silica hydrogels made in other ways may be used in the process of this invention.

If a silica alumina gel is desired, the water slurry of the hydrous silica alumina composite obtained as above described is dried and activated by the application of heat. If it is desired to modify the properties of the hydrous silica alumina composite the slurry may be treated in various ways before drying, that is, the pH may be adjusted as desired, an aging treatment at controlled temperature may be used, etc.

If three component catalysts are desired the silica hydrogel may be impregnated with a solution of a catalytic material before the hydrolysis step, as, for example, impregnating with a solution of ammonium molybdate, chromic acid or other catalytic or promoter agents or agents. Or the silica alumina composite formed by the hydrolysis can be impregnated with other catalytic agents or promoters.

The preferred method of making alumina is from the aluminum alcoholate because it is a cheaper and faster method of making a pure alumina. Aluminum metal in the form of chips, shot, turnings, ingots or the like is reacted with a substantially anhydrous alcohol preferably an aliphatic alcohol such as amyl alcohol or commercial mixtures containing isomeric amyl alcohols. Water soluble aliphatic alcohols such as ethyl, isopropyl or tertiary butyl alcohol, etc., may be used but usually $C_5$ and higher aliphatic alcohols which are liquid at the temperature of operation of the process are preferred because they are less soluble in water and more easily recovered in the process. Or mixtures of different alchols may be used. In some cases a selected hydrocarbon, such as heptane, octane, toluene, xylene, etc., or a hydrocarbon fraction such as a petroleum distillate boiling within the range of 200° to 500° F. or higher is added to the alcohol selected. It is preferred to use a petroleum distillate of narrow boiling range which includes the boiling range of the alcohol used; for example, for use with mixed amyl alcohols a petroleum cut boiling within the range of about 200° to 290° F. is satisfactory.

My process will be first described using a mixture of equal volumes of an isomeric mixture of amyl alcohols and a petroleum hydrocarbon fraction boiling in the range of 220° to 290° F. to to show the general process and then specific examples will be given. A small amount of catalytic material such as mercuric chloride is preferably used but other catalysts such as mercury salts, iodine, aluminum halide, etc., may be used. The catalyst may be added with the aluminum metal or may be separately added. The reaction zone may be maintained at atmospheric or under superatmospheric pressure of about 5 to 100 lbs. per sq. in. gauge, preferably about 25 lbs. per sq. in. gauge. The superatmospheric pressure raises the boiling point of the alcohol and hydrocarbon and aids in their retention in the reaction system. The amount of catalyst used may be about 0.001 part of mercuric chloride per part of aluminum metal by weight, but the amount may be in the range of about 0.001 to 0.01 part by weight per part of aluminum by weight.

It is usually necessary to heat the reaction mixture to initiate the reaction between the aluminum and the alcohol. After the reaction is well started, the reaction becomes rapid and it is usually necessary to cool the reaction mixture. The reaction mixture is heated initially to a temperature of about 200° to 300° F., preferably about 265° F. The temperature which is maintained will depend upon the particular alcohol and petroleum hydrocarbon fraction used and upon the pressure that it is desired to maintain. Preferably the reaction mixture is maintained at a temperature of about 200° F. to 300° F.

The aluminum and alcohol react to form aluminum alcoholate or aluminum alkoxide and hydrogen. Vapors and gases passing overhead may be cooled and condensed liquid and pure hydrogen may be recovered. The aluminum alcoholate in the alcohol-hydrocarbon solution is recovered and stored and will be hydrolyzed with a silica hydrogel as will be hereinafter described in greater detail.

The preparation of the silica hydrosol by cation exchange will now be described. The silica hydrosol is prepared by contacting a sodium silicate or other alkali metal silicate solution preferably a dilute solution with a column of substantially stationary granular cation exchange material.

However, the silica hydrosol may be prepared by first slurrying the sodium silicate solution with a granular cation exchange material while maintaining the slurry on the acid side and then passing the silica hydrosol so formed through a column of substantially stationary granular cation exchange material to remove residual sodium as described in copending Bilisoly, Kimberlin and Segura application Serial No. 246,968 on "Improved Process for The Manufacture of Silica Hydrosols" filed September 15, 1951.

Or the sodium silicate solution may be first mixed with an acid such as sulfurous acid, acetic acid or the like to form an acidic silica hydrosol and the resulting mixture is contacted with granular cation exchange material maintained as a substantially stationary column to produce a substantially pure silica hydrosol as disclosed in Hunter copending application Serial No. 235,111 on "Improved Process for The Manufacture of Silica Hydrosols" filed July 3, 1951, and Kimberlin copending application Serial No. 239,612 on "Improved Process for The Manufacture of Silica Hydrosols" filed July 31, 1951. Other methods of making the silica hydrosol may be used where the silica hydrosol is produced by a cation exchange material and the present invention is not to be limited to any particular process described.

Any of the commercially available alkali metal silicates can be used such as those from $$Na_2O \cdot 6SiO_2$$

to $Na_2 \cdot 3.5SiO_2$. The sodium silicate is preferably diluted so that it contains not more than about 150 gm. of $SiO_2$ per liter and preferably not more than about 80 gm. of $SiO_2$ per liter.

As the exchange material, the preferred one is a resin of the acid regenerated cation type. Such cation exchange resins are available as commercial products. These exchange resins are obtained by condensing aldehydes such as formaldehyde with phenols or with phenol-sulfonic acids or with phenol-carboxylic acids or the like. The sulfonic acid type resin or strong acid type resin is preferred such as the IR–120 Amberlite resin. Other exchange materials which may be used are sulfuric acid treated coal, or wood or waste petroleum sludge or lignite or the like. Also the sulfonated polystyrene type exchange resins may be used. These exchange materials are treated with an acid such as sulfuric acid to put them in the hydrogen cycle for use in removing cations or sodium in this particular case. Exchange resins are sold by Resinous Products and Chemical Company under the name of Amberlite.

The quantity of sodium silicate used should not exceed the amount that can be substantially freed of soda by the cation exchange resin, that is, the capacity of the resin for substantially complete soda removal should not be exceeded. The silica hydrosol leaving the cation exchange resin or other exchange material should not contain more than about 0.2% soda ($Na_2O$), preferably below 0.1% soda calculated on a dry basis. After the cation exchange material has been used for some time, it is necessary to regenerate it and this will be described generally now and in more detail hereinafter.

When sodium silicate or other alkali metal silicate is percolated through a cation exchange resin bed, the alkali metal is removed from the silicate solution and replaced by hydrogen so that an exceedingly pure silicic acid or silica hydrosol is obtained. After the resin has taken up a certain amount of alkali metal which can be determined by obtaining the pH of the product (pH is maintained below about 4 in order to control the purity of the silica hydrosol), it is washed and then regenerated with an acid such as sulfuric acid or hydrochloric acid or the like to replace the alkali metal with hydrogen with the formation of sodium sulfate or chloride depending on the acid used in the regeneration and the resin after rinsing with water is ready for another exchange cycle.

The silica hydrosol prepared by the cation exchange method is substantially a pure silica hydrosol containing about 3% to 8% by weight of silica and less than about 0.2 $Na_2O$ on a dry basis.

Th silica hydrosol is preferably set to a silica hydrogel by adjusting the pH to about 5 to 6 or aging for about 1 to 72 hours at 200 to 70° F. and the resulting hydrogel needs no water washing because the silica hydrogel is substantially pure. The silica hydrogel contains about 97% to 92% by weight of water and this water in the hydrogel is used as the hydrolyzing agent or medium in the process of this invention.

The silica hydrogel produced as above described and containing about 92 to 97% by weight of water and the aluminum alcoholate in a solution of alcohol and hydrocarbon are mixed in a mixing tank and agitated therein to hydrolyze the aluminum alcoholate. The water in the structure of the silica hydrogel precipitates the aluminum as a hydrous alumina within the structure of the silica hydrogel. Milling or any other mixing procedure may be used to accomplish commingling of the aluminum alcoholate and the silica hydrogel containing less than about 10% of solids.

The hydrolyzed mixture is then passed to a settler before being passed to a stripping tower. When a settler is used, the hydrolyzed mixture separates into a lower aqueous phase containing the slurry of silica alumina particles and an upper layer comprising the major proportion of the regenerated alcohol and hydrocarbon. The upper layer comprising regenerated alcohol and hydrocarbon and some water is withdrawn and passed to a drying or dewatering tower to remove water from the mixture of alcohol and hydrocarbon and the anhydrous mixture can then be used for reacting with an additional amount of aluminum to make more aluminum alcoholate.

The lower aqueous layer is passed to a stripping tower to remove residual alcohol and hydrocarbons.

When no settler is used the hydrolyzed mixture is passed to the stripping tower to remove the regenerated alcohol and hydrocarbon mixture from the hydrolyzed mixture of hydrogel and alcoholate. The stripping tower may be a baffled or packed tower but other designs of distilling equipment may be used. The bottoms of the stripping tower are heated to a temperature of about 200° F. to 220° F., preferably about 212° F. and alcohol, hydrocarbon and water in vapor form are removed overhead. The alcohol and hydrocarbon are recovered and reused as above described.

The water slurry of silica-alumina containing about 90 to 95% by weight water is withdrawn from the stripping tower and further treated in any desired manner to recover dry silica alumina catalyst. For example, the slurry may be filtered to remove some of the water and then dried or the slurry may be fed to a spray dryer to produce hard dry spheroidal particles of silica alumina catalyst. Or the water slurry may be filtered and the filtered particles dried in any conventional manner and then activated, if desired, to produce silica alumina catalyst.

By varying the silica hydrogel to the aluminum alcoholate, silica alumina catalysts containing 5 to 40% by weight of alumina with the rest being silica may be produced.

*Example 1*

An aluminum alcoholate was prepared by reacting 864 grams aluminum with 32 liters of a 50–50% by volume of mixed amyl alcohols (Pentasol) and a distillate petroleum hydrocarbon fraction having a boiling range of about 220° to 290° F. using about 0.001 part by weight of mercuric chloride per part of aluminum by weight as catalyst. The aluminum alcoholate dissolved in the alcohol-hydrocarbon mixture was mixed in a ball mill with 54 pounds (2448 grams $SiO_2$) of washed silica hydrogel for about 16 hours. The silica hydrogel was prepared by mixing equal volumes of 1.21 specific gravity sodium silicate solution ($Na_2O \cdot 3.25SiO_2$) and 1.19 specific gravity sulfuric acid solution. The resultant hydrosol was allowed to set to a hydrogel and washed free of reactant salts. The washed silica hydrogel contained 10% $SiO_2$. The product from the ball mill was charged to a still and the alcohol and hydrocarbon and water were removed from the catalyst. About 6 hours of heating at 210–240° F. were required to remove the alcohol and hydrocarbon and water from the catalyst. The catalyst was finally dried in a steam heated oven. When pilled and tested in a fixed bed 200 cc. unit using East Texas Light gas oil feed at 950° F. and 2 volumes of feed per volume of catalyst per hour in 30 minute cycles the catalyst gave the data which are tabulated below:

| Catalyst | Pretreatment | Cracking Test Data | | | | Analyses | |
|---|---|---|---|---|---|---|---|
| | | Vol. Percent D+L | Vol. Percent Conv. | Wt. Percent of Feed | | Percent $Al_2O_3$ | Percent $Na_2O$ |
| | | | | Carbon | Gas | | |
| Example 1 | 1,000° F | 45.0 | 58.0 | 6.7 | 21.5 | 38.1 | 0.08 |
| | Steamed [1] | 34.0 | 43.0 | 2.9 | 14.7 | | |

[1] Steamed 24 hours at 1,050° F. and 60 p. s. i. g.

Example 2

Sixty pounds of washed silica hydrogel containing 6 pounds of $SiO_2$ and prepared in the same manner as the silica hydrogel used in Example 1 was mixed with 29.5 pounds of aluminum nitrate $(Al(NO_3)_3 \cdot 9H_2O)$ in a ball mill for 24 hours. The product from the ball mill was dried at 250° F. and then heated at 1000° F. to decompose the nitrate. When pilled and tested in a fixed bed 200 cc. unit using East Texas Light gas oil feed at 950° F. and 2 volumes of feed per volume of catalyst per hour in 30 minute cycles the catalyst gave the data which are tabulated below:

| Catalyst | Pretreatment | Cracking Test Data | | | | Analyses | |
|---|---|---|---|---|---|---|---|
| | | Vol. Percent D+L | Vol. Percent Conv. | Wt. Percent of Feed | | Percent $Al_2O_3$ | Percent $Na_2O$ |
| | | | | Carbon | Gas | | |
| Example 2 | 1,000° F | 35.5 | 40.5 | 1.9 | 11.0 | 43.2 | 0.11 |
| | Steamed [1] | 25.0 | 27.7 | 0.6 | 6.8 | | |

[1] Steamed 24 hours at 1,050° F. and 60 p. s. i. g.

The data of Examples 1 and 2 are summarized as follows:

| Catalyst Pretreatment | 200 cc. Unit Cracking Test | |
|---|---|---|
| | Heated to 1,000° F. | Heated to 1,000° F., steamed 24 Hours at 1,050° F. and 60 p. s. i. g. |
| Cracking Conditions: | | |
| Amount of Catalyst | 200 cc | 200 cc. |
| Temperature, °F | 950 | 950. |
| Feed | East Texas Light Gas Oil. | East Texas Light Gas Oil. |
| Feed Rate, Ml/Hr | 480 | 480. |
| Length of Test | 30 min | 30 min. |
| Quantity Feed, Ml | 240 | 240. |

| | Percent D+L | Vol. Percent Conv. | Percent D+L | Vol. Percent Conv. |
|---|---|---|---|---|
| Example 1 | 45.0 | 58.0 | 34.0 | 43.0 |
| Example 2 | 35.5 | 40.5 | 25.0 | 27.7 |

From the above data it will be seen that with the present process a more steam stable catalyst is produced.

What is claimed is:

1. A process for preparing catalysts which comprises hydrolyzing an anhydrous aluminum alcoholate solution with a silica hydrogel containing at least 90% water to precipitate hydrous alumina in the silica hydrogel and removing water from the mixture to form a dry hard silica alumina gel catalyst.

2. A process for producing steam stable hydrocarbon conversion catalysts which comprises mulling an anhydrous aluminum alcoholate with a silica hydrogel containing at least 90% water to hydrolyze the aluminum alcoholate and to precipitate hydrous alumina in the silica hydrogel, removing water and alcohol from the mulled mixture and drying to form silica alumina catalyst.

3. A process according to claim 2 wherein the mulled mixture is spray dried to form dry silica alumina spheroidal particles.

4. A process according to claim 2 wherein the aluminum alcoholate is one formed from a water immiscible alcohol which separates as a layer following the hydrolysis step and the separated alcohol is recovered and reused in the preparation of additional aluminum alcoholate.

5. A process for preparing steam stable cracking catalysts which comprises mulling for an extended period of time a silica hydrogel containing at least 90% water with an anhydrous solution of an aluminum alcoholate to cause intimate mixing of the silica hydrogel and aluminum alcoholate and to hydrolyze the aluminum alcoholate and to precipitate hydrous alumina within the structure of the silica hydrogel, then removing liquid from the mulled mixture to form steam stable silica alumina in dry hard form.

6. A process for producing steam stable cracking catalysts which comprises mulling an anhydrous aluminum alcoholate solution with a substantially pure silica hydrogel containing at least 90% water for about 16 hours to hydrolyze the aluminum alcoholate and to precipitate hydrous alumina within the structure of the silica hydrogel and then removing liquid from the mulled mixture to form silica alumina catalyst.

7. A process for producing steam stable cracking catalysts which comprises mulling an anhydrous aluminum alcoholate with a substantially pure silica hydrogel containing at least 90% water for an extended period of time to cause intimate mixing and to hydrolyze the aluminum alcoholate and to precipitate hydrous alumina within the structure of the silica hydrogel, then removing water and alcohol from the mulled mixture and heating the resulting mixture to form silica alumina catalyst.

ROBERT E. SCHEXNAILDER.

References Cited in the file of this patent

UNITED STATES PATENTS

| Number | Name | Date |
|---|---|---|
| 1,782,857 | Miller et al. | Nov. 25, 1930 |
| 2,326,706 | Thomas et al. | Aug. 10, 1943 |
| 2,435,158 | Red | Jan. 27, 1948 |
| 2,457,970 | Bailie | Jan. 4, 1949 |
| 2,570,058 | Hunter | Oct. 2, 1951 |
| 2,582,254 | Hunter | Jan. 15, 1952 |